US008749578B2

(12) United States Patent
Sheba et al.

(10) Patent No.: US 8,749,578 B2
(45) Date of Patent: Jun. 10, 2014

(54) METHODS, SYSTEMS, AND COMPUTER READABLE MEDIA FOR AUTOMATIC GENERATION OF GRAPHIC ARTWORK TO BE PRESENTED DURING DISPLAYING, PLAYING OR BROWSING OF MEDIA FILES

(75) Inventors: Yaron Sheba, Mountain View, CA (US); Derek Niizawa, Sunnyvale, CA (US); John Anthony Becker, Ocean City, NJ (US); Erez Zvi Testiler, Wilmington, DE (US)

(73) Assignee: Sandisk Technologies Inc., Plano, TX (US)

( * ) Notice: Subject to any disclaimer, the term of this patent is extended or adjusted under 35 U.S.C. 154(b) by 1203 days.

(21) Appl. No.: 12/624,372

(22) Filed: Nov. 23, 2009

(65) Prior Publication Data

US 2011/0090249 A1    Apr. 21, 2011

Related U.S. Application Data

(60) Provisional application No. 61/252,496, filed on Oct. 16, 2009.

(51) Int. Cl.
*G09G 5/00* (2006.01)
(52) U.S. Cl.
USPC .................... 345/629; 345/619; 345/649
(58) Field of Classification Search
USPC .......................................................... 345/619
See application file for complete search history.

(56) References Cited

U.S. PATENT DOCUMENTS 5,754,242  A  *  5/1998  Ohkami ..................... 348/441
2002/0149600  A1*  10/2002  Van Splunter et al. ....... 345/592
2004/0143604  A1    7/2004  Glenner et al.
2008/0094400  A1    4/2008  Yang et al.
(Continued)

OTHER PUBLICATIONS

"MP3," Wikipedia, http://en.wikipedia.org/wiki/Mp3, Publication Date Unknown. Downloaded from the Internet on Nov. 23, 2009.

(Continued)

*Primary Examiner* — James A Thompson
*Assistant Examiner* — Wynton S Jones
(74) *Attorney, Agent, or Firm* — Jenkins, Wilson, Taylor & Hunt, P.A.

(57) ABSTRACT

Methods, systems, and computer readable media for automatic generation of graphic artwork to be presented by a device during playing or browsing of a media file by the device are provided. One method includes providing, via a computer or mobile device, a user interface through which a user can select a media file for which graphic artwork is to be generated and initiate automatic graphic artwork generation for the media file. The method further includes providing access to a media file graphic artwork generator via the computer or mobile device, where the media file graphic artwork generator, in response to user selection of the media file and the initiation of the media file artwork generation, automatically selects a plurality of images from at least one group of images, varies parameters of at least some of the images, and combines the images to form a graphic artwork file. At least one of the image selecting, the image parameter varying, and the image combining is performed using an algorithm structured to produce varying output in successive iterations of the algorithm invoked with the same input. The media file graphic artwork generator associates the graphic artwork file with the media file for display when the media file is browsed, displayed or played.

22 Claims, 4 Drawing Sheets

(56) References Cited

U.S. PATENT DOCUMENTS

| | | | |
|---|---|---|---|
| 2008/0168365 A1 | 7/2008 | Chaudhri | |
| 2008/0178068 A1 | 7/2008 | Chaudhri | |
| 2008/0266322 A1* | 10/2008 | Isomura | 345/629 |
| 2009/0235178 A1* | 9/2009 | Cipriani et al. | 715/741 |
| 2009/0259567 A1* | 10/2009 | Watts | 705/27 |

OTHER PUBLICATIONS

"Tag Editor," Wikipedia, http://en.Wikipedia.org/wiki/Tag_editor, Publication Date Unknown Downloaded from the Internet on Nov. 23, 2009.

Dowsett et al., "Tau Player," University of Kent Co600 tau Music Application, (2008).

* cited by examiner

METHODS, SYSTEMS, AND COMPUTER READABLE MEDIA FOR AUTOMATIC GENERATION OF GRAPHIC ARTWORK TO BE PRESENTED DURING DISPLAYING, PLAYING OR BROWSING OF MEDIA FILES

PRIORITY CLAIM

This application claims the benefit of U.S. Provisional Patent Application Ser. No. 61/252,496, filed Oct. 16, 2009; the disclosure of which is incorporated herein by reference in its entirety.

TECHNICAL FIELD

The subject matter described herein relates to the association of graphic artwork with media files that can be played or displayed on media devices. More particularly, the subject matter described herein relates to methods, systems, and computer readable media for automatic generation of graphic artwork to be presented during displaying, playing, or browsing of media files.

BACKGROUND

Media files, such as audio files and video files playable on portable media players, often have associated image files that are displayed during browsing or playback of the media files. For example, motion picture experts group audio layer 3 (MP3) files and other audio file formats have associated ID3 tags or other metadata fields that store images displayed with the MP3 files are browsed by a user or played. One type of image file that is often stored in the ID3 tag is an image of an album cover that is displayed during browsing of albums or songs or during playback of a song. Image files containing graphic artwork are also associated with video files and are displayed when the video files are browsed or displayed in an electronic library.

Because album covers and other images associated with media files are works of visual art whose copyrights may be separately controlled from the rights in the underlying media files, it is not always possible for users or media file providing services to obtain rights to the original album covers or other images that are distributed with hard copy versions of media files. For example, a media file providing service may wish to provide media files and associated graphic artwork to its users. If the media file providing service is unable to obtain rights to the graphic artwork associated with the media files, then the user's experience in accessing the media files is diminished, as the media files are not associated with visually appealing or even unique images. For example, if media file management software on a users computer associates a default image with media files that do not have images embedded in their ID3 tags, each of these media files will be associated with the same default image, making visual browsing of media files stored in an electronic library difficult.

Some existing cover art retrievers and/or generators rely on complex analysis of media file content or media file metadata to retrieve or generate cover art. Such complex analysis is processor intensive and can delay the time for obtaining media file graphic artwork. Moreover, generation techniques that rely on media file content or metadata may be produce the same graphic artwork for a given set of inputs, resulting non-unique images. For example, one user who desires to generate media file graphic artwork for a given media file where the generation algorithm relies on media content or metadata may find that his or her media file graphic artwork generates the same graphic artwork for the media file as the media file graphic artwork generator of another user. Such non-unique images may be undesirable if a user desires his or her graphic artwork to be unique or different from that of other users.

Further, different sets of metadata and/or image content may result in the generation of media file graphic artwork for media files of the same user that are the same. As a result, the user may not be able to distinguish between the different media files whose automatic, content-based media file graphic artwork generation resulted in the same media file graphic artwork.

Accordingly, in light of these difficulties, there exists a long felt need for methods, systems, and computer readable media for automatic generation of graphic artwork to be presented during displaying, playing, or browsing.

SUMMARY

Methods, systems, and computer readable media for automatic generation of graphic artwork to be presented by a device during, displaying, playing, or browsing of a media file by the device are provided. One method includes providing, via a computer or mobile device, a user interface through which a user can select a media file for which graphic artwork is to be generated and initiate automatic graphic artwork generation for the media file. The method further includes providing access to a media file graphic artwork generator via the computer or mobile device, where the media file graphic artwork generator, in response to user selection of the media file and the initiation of the media file artwork generation, automatically selects a plurality of images from at least one group of images, varies parameters of at least some of the images, and combines the images to form a graphic artwork file. At least one of the image selecting, the image parameter varying, and the image combining is performed using an algorithm structured to produce varying output in successive iterations of the algorithm invoked with the same input. The media file graphic artwork generator associates the graphic artwork file with the media file for display when the media file is browsed, displayed or played.

The subject matter described herein for automatically generating graphic artwork for display during playing or browsing of a media file may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Figure 1:
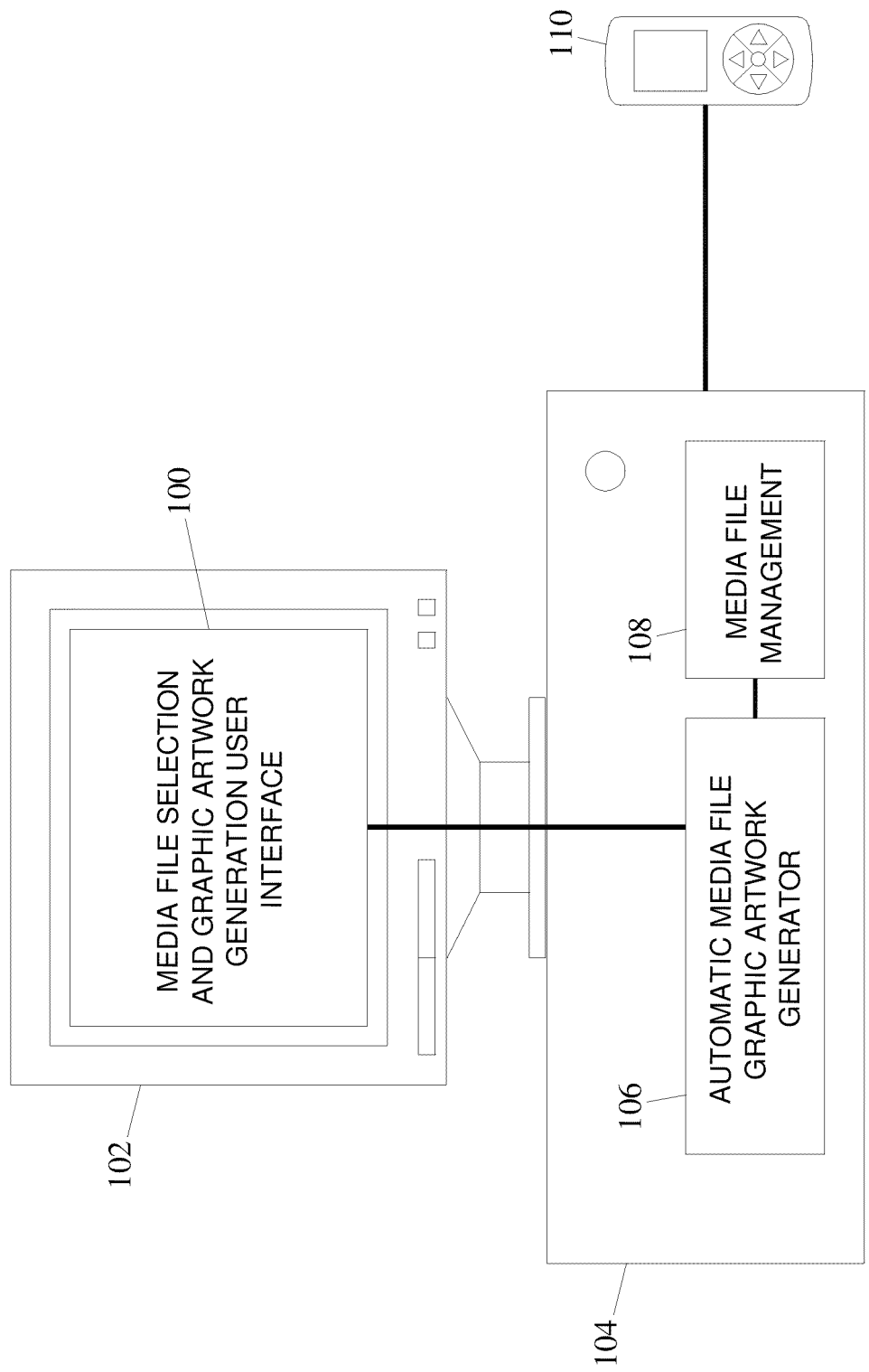
FIG. 1 is a block diagram illustrating an exemplary system for automatic generation of graphic artwork to be presented during browsing or playing of a media file according to an embodiment of the subject matter described herein.

The subject matter described herein includes methods, systems, and computer readable media for automatically generating graphic artwork to be displayed during browsing or playing of a media file. FIG. 1 is a block diagram of an exemplary system for automatically generating graphic artwork to be displayed during browsing or playing of a media file according to an embodiment of the subject matter described herein. Referring to FIG. 1, an exemplary system for automatically generating graphic artwork to be displayed during browsing or playing of a media file includes a media file selection and graphic artwork generation user interface 100 through which a user selects a media file and initiates automatic artwork generation for the media file. User interface 100 may be presented on a display device 102 associated with a personal computer 104. Alternatively, user interface 100 may be presented on a display associated with a mobile phone, a portable media player, a smart phone, or any combination thereof.

The system also includes an automatic media file graphic artwork generator 106 that automatically generates graphic artwork for the media file in response to user selection of the media file and initiation of the automatic graphic artwork generation. In one embodiment, automatic media graphic artwork generator 106 is an application that executes on computer 104 on which the user stores or accesses media files. Computer 104 may be the same device on which the user browses or plays the media files. Alternatively, computer 104 may include a media file management application 108 that allows the user to download media files to a device 110 separate from computer 104. Device 110 may be a portable media player with fixed internal storage, such as a hard disk drive or flash RAM for storing media files. Device 110 may alternatively be a slot media player with removable internal storage for storing media filed play be device 110. In yet another embodiment, device 110 may be a removable portable memory card, such as a micro secure digital (micro-SD) card, an SD card, a multimedia card (MMC), or any other type of portable memory card, that is capable of storing media files for display and browsing by a portable media player.

In operation, user interface 100 may receive selection of a media file from a user. The media file may be an audio file, such as an MP3 file corresponding to a song; a collection of audio files, such as an album; a video file; or any combination of audio and video files. User interface 100 may also receive an indication that the user desires to initiate automatic graphic artwork generation for the media file. In response to the user selection of the media file and initiation of automatic artwork generation, automatic media file graphic artwork generator 106 may automatically generate graphic artwork for the media file by selecting images from sets of stock images, varying parameters for the images, and combining the images. Automatic media file graphic artwork generator 106 may associate the generated graphic artwork with the media file. In one example, automatic media file graphic artwork generator 106 may embed the generated graphic artwork in an ID3 tag associated with the media file so that the graphic artwork will be displayed with the media file each time the media file is played or browsed.

Figure 2:
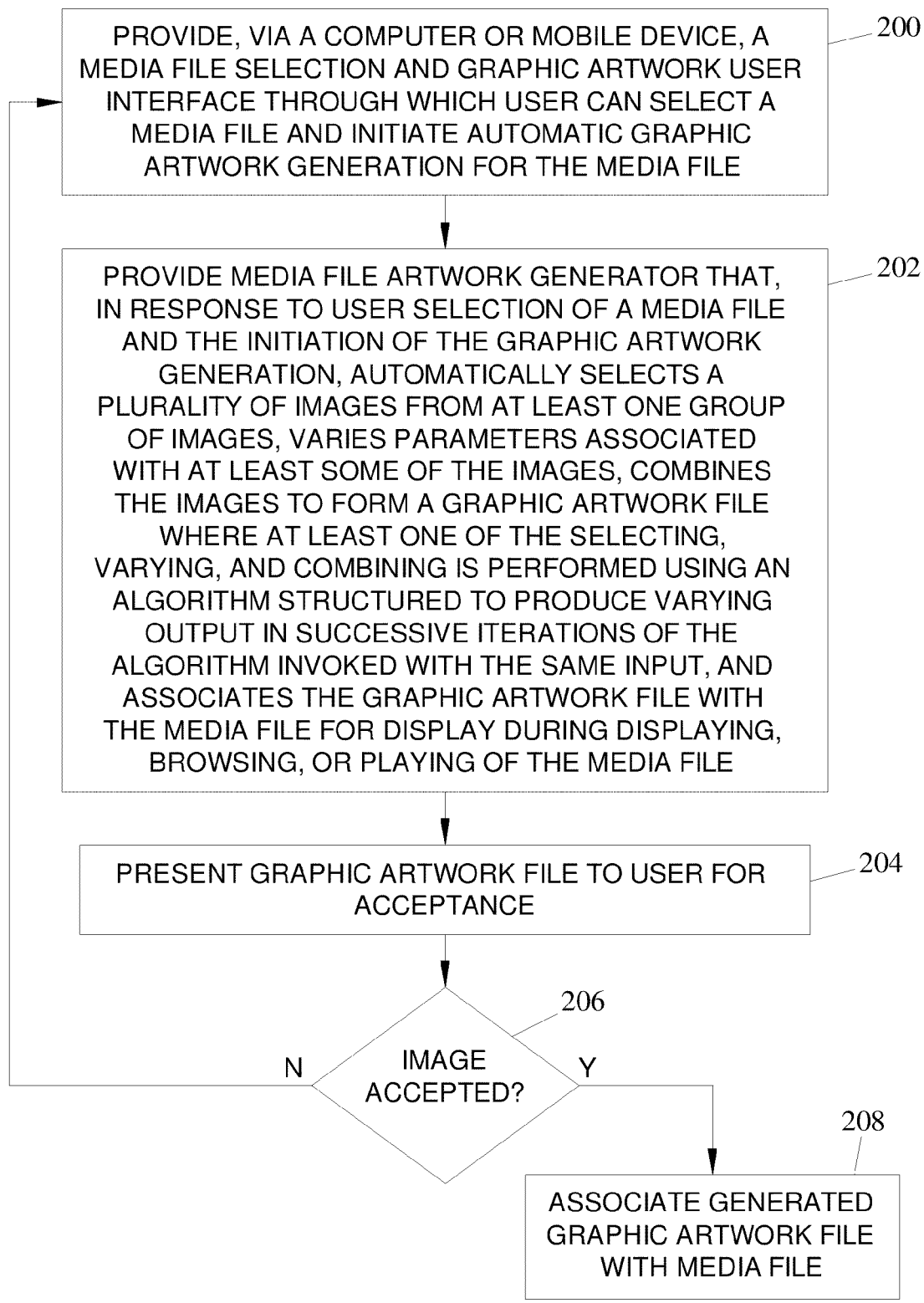
FIG. 2 is a flow chart illustrating an exemplary process for automatic generation of graphic artwork to be presented during browsing or playing of a media file according to an embodiment of the subject matter described herein.

FIG. 2 is a flow chart illustrating exemplary steps that may be performed by user interface 100 and automatic media file artwork generator 106 in automatically generating graphic artwork to be associated with a media file and for associating the graphic artwork with the media file according to an embodiment of the subject matter described herein. Referring to FIG. 2, in step 200, a media file selection and graphic artwork generation user interface through which a user can select a media file and initiate automatic graphic artwork generation for the media file is provided. For example, user interface 100 may present a media file library to the user containing a listing of all media files currently accessible by user interface 100. User interface 100 may present the user with a mechanism for selecting one or more of the media files in the library. Exemplary mechanisms that may be presented include selection boxes where the user highlights and selects items in one box and selected items appear in another box, a graphical select button that when pressed selects any media files highlighted by the user, a dropdown menu whether the user highlights selected media files, or any other suitable media file selection mechanism.

In step 202, a media file artwork generator is provided that, in response to the user selection of the media file and the initiation of automatic artwork generation for the media file, automatically selects a plurality of images from at least one group of images, varies parameters associated with at least some of the images, and combines the images to form a graphic artwork file. At least one of the image selecting, the parameter varying, and the image combining is performed using an algorithm structured to produce varying output in successive iterations of the algorithm invoked with the same input. The media file graphic artwork generator associates the graphic artwork file with the media file for display during browsing, displaying, or playing of the media file. In one example, automatic media file artwork generator 106 uses a set of four types of stock images as input to generate the graphic artwork. These four different types of stock images are as follows:

Base
Background
Pattern
Top

Figure 3:
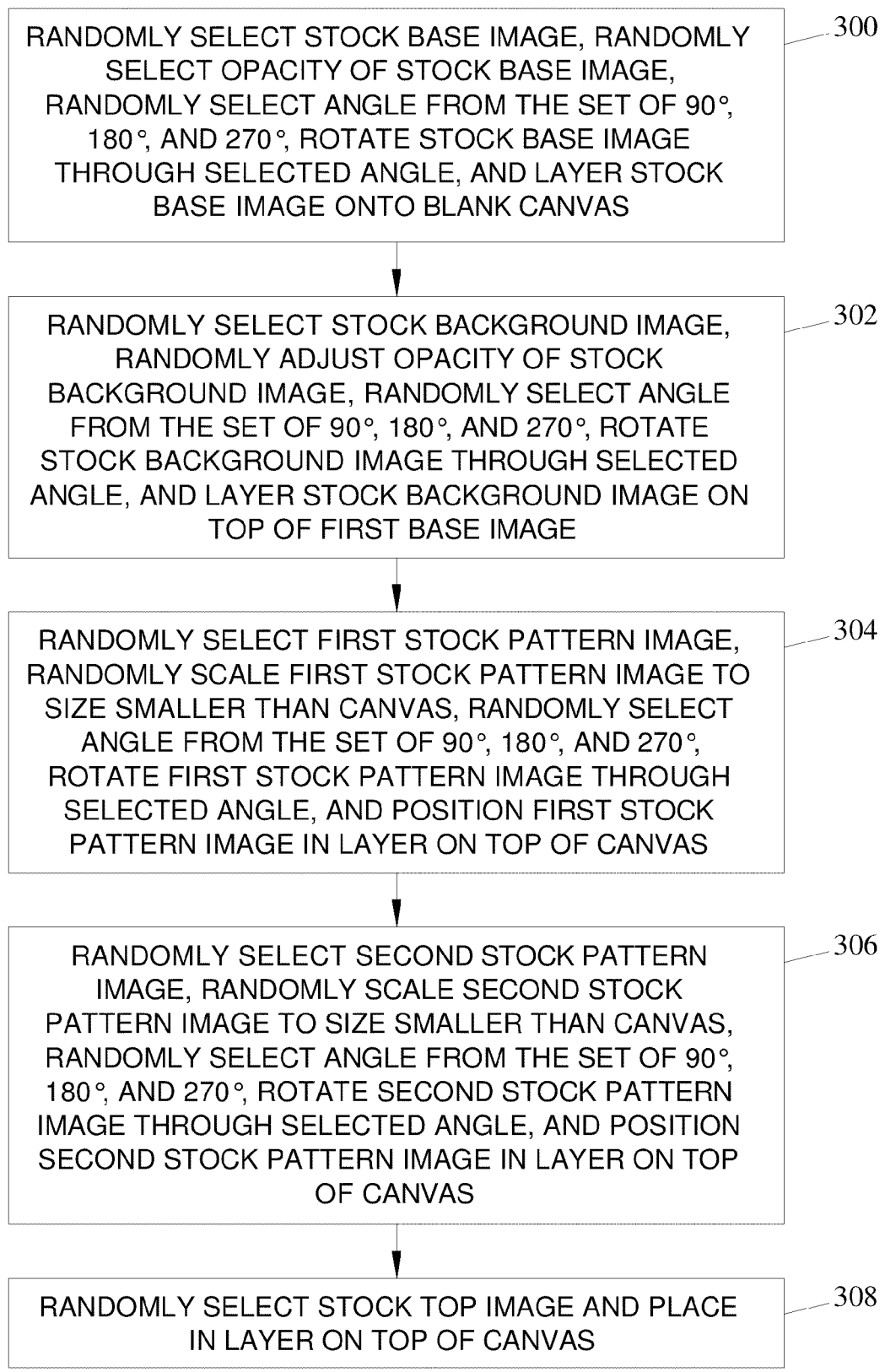
FIG. 3 is a flow chart illustrating exemplary steps for automatically generating a graphic artwork file according to an embodiment of the subject matter described herein.
Figure 4:
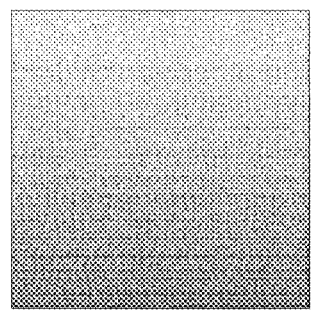
FIG. 4 illustrates an exemplary stock base image generating using automatic media file graphic artwork generation according to an embodiment of the subject matter described herein.

In one exemplary implementation, automatic media file artwork generator 106 is pre-loaded with several stock images of each type. When the automatic media file generation is initiated, the events or steps in FIG. 3 may occur. Referring to FIG. 3, in step 300, automatic media file artwork generator 106 randomly selects a stock base image, randomly adjusts the opacity of the base image, randomly selects an angle from the set of 90, 180, and 270 degrees, rotates the stock base image through the selected base angle, and layers the base image onto a blank canvas. FIG. 4 is an example of the automatically generated artwork after step 300 in FIG. 3 has been executed.

Figure 5:
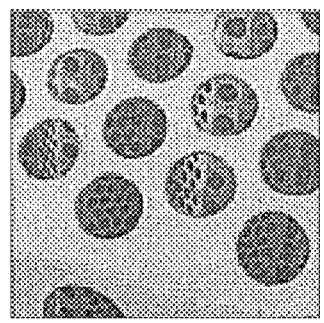
FIG. 5 illustrates an exemplary background image layered on top of the image of FIG. 4 generated using automatic media file graphic artwork generation according to an embodiment of the subject matter described herein.

Returning to FIG. 3, in step 302, automatic media file graphic artwork generator 106 randomly selects a stock background image, randomly adjusts the opacity of the stock background image, and randomly selects an angle from the set of 90, 180, and 270 degrees, rotates the stock background image by the selected angle, and layers the background image on top of the first base image. FIG. 5 is an example of the automatically generated graphic artwork file after execution of step 302 in FIG. 3.

Figure 6:
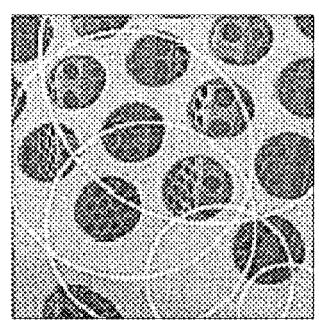
FIG. 6 illustrates an exemplary stock pattern image layered on top of the images in FIGS. 4 and 5 generated using automatic media file graphic artwork generation according to an embodiment of the subject matter described herein.

Returning to FIG. 3, in step 304, automatic media file graphic artwork generator 106 randomly selects a first stock pattern image, randomly scales the first stock pattern image to a size smaller than the canvas, randomly selects an angle from the set of 90, 180, and 270 degrees, randomly rotates the first stock pattern image by the selected angle, and positions the first stock pattern image in a layer on top of the canvas. FIG. 6 illustrates an example of the automatically generated graphic artwork file after execution of step 304 in FIG. 3.

Figure 7:
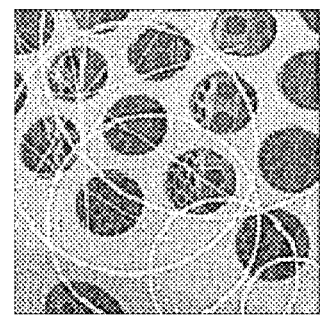
FIG. 7 illustrates an exemplary second stock pattern image layered on top of the images of FIGS. 4-6 generated using automatic media file graphic artwork generation according to an embodiment of the subject matter described herein.

Returning to FIG. 3, in step 306, automatic media file graphic artwork generator 106 randomly selects a second stock pattern image, randomly scales the second stock pattern image to a size smaller than the canvas, randomly selects an angle from the set of 90, 180, and 270 degrees, randomly rotates the second stock pattern image by the selected angle, and positions the second stock pattern image in a layer on top of the canvas. FIG. 7 illustrates an exemplary automatically generated graphic artwork file after the execution of step 306 illustrated in FIG. 3.

Figure 8:
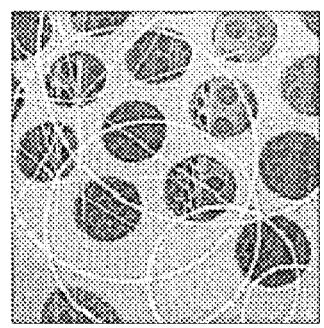
FIG. 8 illustrates an exemplary stock top image layered on top of the images of FIGS. 4-7 generated using automatic media file graphic artwork generation according to an embodiment of the subject matter described herein.

Returning to FIG. 3, in step 308, automatic media file artwork generator 106 randomly selects a stock top image, automatically and randomly adjusts the opacity of the stock top image, randomly selects an angle from the set of 90, 180, and 270 degrees, and places the stock top image in a layer on top of the canvas. FIG. 8 is an example of the automatically generated graphic artwork file after the execution of step 308 in FIG. 3.

Returning to FIG. 2, in step 204, after creating the multi-layered image, which is likely unique with respect to other images generated for media files stored by a particular user (due to the multiple random variations) and visually appealing, automatic media file graphic artwork generator 106 presents the image to the user via user interface 102 for acceptance.

In steps 206 and 208, if the user accepts the image, automatic media file graphic artwork generator 106 associates the graphic artwork file with the media file. For example, automatic media file graphic artwork generator 106 may make the association between the graphic artwork file and the media file by embedding the graphic artwork file in the ID3 tag using the standard ID3 cover art mechanism. By embedding the generated graphic artwork file in the ID3 tag of the selected media file, the same automatically generated graphic artwork file can be displayed each time the media file is played or browsed.

In step 206, if the graphic artwork file is not accepted, control returns to step 200 where the process re-starts for automatically generating new graphic artwork for acceptance by the user.

In the embodiment illustrated in FIG. 2, a single image is created during the image creation process. In an alternate implementation, plural images may be created and displayed concurrently for acceptance by the user.

In the examples above, image parameter alterations are described as being performed randomly. It is understood that perfect random number generation may not be achievable. Accordingly, the term "randomly" is intended to refer to performing a task using an algorithm whose goal is to produce varied output for successive iterations of the algorithm with the same set of inputs. Exemplary random number generation algorithms suitable for use with embodiments of the subject matter described herein include any of the pseudo-random number generation algorithms available in standard C++ or other programming language libraries.

Because the subject matter described herein for automatically generating graphic artwork to be associated with a media file uses random number generation to select and generate the graphic artwork files, the need for complex analysis of the media file itself or metadata associated with the media file in order to determine or generate graphic artwork for the media file is reduced. In one embodiment, the automatic graphic artwork generation described herein may be performed independently of media file content, genre, and/or media file metadata.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for automatic generation of graphic artwork to be presented during playing or browsing of a media file, the method comprising:
providing, via a computer or mobile device, a media file selection and graphic artwork generation user interface through which a user can select a media file for which graphic artwork is to be generated and initiate automatic graphic artwork generation for the media file; and
providing access to a media file graphic artwork generator via the computer or mobile device, where the media file graphic artwork generator, in response to user selection of the media file and the initiation of the media file graphic artwork generation, automatically selects images from at least one group of images, varies parameters of at least some of the images, and combines the images to form a graphic artwork file, wherein at least one of the image selecting, parameter varying, and image combining is performed using an algorithm structured to produce varying output in successive iterations of the algorithm invoked with the same input, and wherein the media file graphic artwork generator associates the graphic artwork file with the media file for display when the media file is browsed, displayed, or played, wherein the media file comprises an audio file and wherein the media file graphic artwork generator selects image content to be included in the graphic artwork file to be displayed during playing of the audio file independently of content, genre, or metadata associated with the audio file.

2. The method of claim 1 wherein the media file graphic artwork generator randomly varies the parameters of at least some of the images.

3. The method of claim 2 wherein the parameters include at least one of: image opacity, image rotation angle, and image size.

4. The method of claim 1 wherein the media file graphic artwork generator combines the images by layering the images on top of each other.

5. The method of claim 1 wherein the media file graphic artwork generator generates the graphic artwork file by:
randomly selecting a stock base image;
randomly adjusting an opacity of the stock base image;
rotating the stock base image by a randomly selected angle; and
layering the stock base image onto a blank canvas.

6. The method of claim 5 wherein the media file graphic artwork generator generates the graphic artwork file by:
randomly selecting a stock background image;
randomly adjusting an opacity of the stock background image; and
layering the stock background image on top of the stock base image.

7. The method of claim 6 wherein the media file artwork generator automatically generates the graphic artwork file by:
randomly selecting a first stock pattern image;
randomly scaling the first stock pattern image to a size smaller than the canvas;
rotating the first stock pattern image through a randomly selected angle; and
positioning the first stock pattern image in a layer on top of the canvas.

8. The method of claim 7 wherein the media file artwork generator automatically generates the graphic artwork file by:
randomly selecting a second stock pattern image;
randomly scaling the second stock pattern image to a size smaller than the canvas;
rotating the second stock pattern image through a randomly selected angle; and
positioning the second stock pattern image in a layer on top of the canvas.

9. The method of claim 8 wherein the media file artwork generator automatically generates the graphic artwork file by:
randomly selecting a stock top image;
randomly adjusting a opacity of the stock top image; and
positioning the stock top image in a layer on top of the canvas.

10. The method of claim 1 comprising presenting the graphic artwork file to a user for acceptance, and, in response to receiving the acceptance, storing the automatically generated graphic artwork file as an ID3 tag associated with the media file.

11. A system for automatic generation of graphic artwork to be presented during playing or browsing of a media file, the system comprising:
a media file selection and graphic artwork generation user interface accessible through a computer or mobile device through which a user can select a media file for which graphic artwork is to be generated and initiate automatic graphic artwork generation for the media file; and
a media file graphic artwork generator accessible through the computer or mobile device and that, in response to user selection of the media file and the initiation of the media file graphic artwork generation, automatically selects images from at least one group of images, varies parameters of at least some of the images, and combines the images to form a graphic artwork file, wherein at least one of the image selecting, parameter varying, and image combining is performed using an algorithm structured to produce varying output in successive iterations of the algorithm invoked with the same input, and wherein the media file graphic artwork generator associates the graphic artwork file with the media file for display when the media file is browsed, displayed, or played, wherein the media file comprises an audio file and wherein the media file graphic artwork generator selects image content to be included in the graphic artwork file to be displayed during playing of the audio file independently of content, genre, or metadata associated with the audio file.

12. The system of claim 11 wherein the media file graphic artwork generator randomly varies the parameters of at least some of the images.

13. The system of claim 12 wherein the parameters include at least one of: image opacity, image rotation angle, and image size.

14. The system of claim 11 wherein the media file graphic artwork generator combines the images by layering the images on top of each other.

15. The system of claim 11 wherein the media file graphic artwork generation generates the graphic artwork file independently of content, genre, or metadata associates with the media file.

16. The system of claim 11 wherein the media file graphic artwork generator generates the graphic artwork file by:
randomly selecting a stock base image;
randomly adjusting an opacity of the stock base image;
rotating the stock base image by a randomly selected angle; and
layering the stock base image onto a blank canvas.

17. The system of claim 16 wherein the media file artwork generator generates the graphic artwork file by:
randomly selecting a stock background image;
randomly adjusting an opacity of the stock background image; and
layering the stock background image on top of the stock base image.

18. The system of claim 17 wherein the media file artwork generator automatically generates the graphic artwork file by:
randomly selecting a first stock pattern image;
randomly scaling the first stock pattern image to a size smaller than the canvas;
rotating the first stock pattern image through a randomly selected angle; and
positioning the first stock pattern image in a layer on top of the canvas.

19. The system of claim 18 wherein the media file artwork generator automatically generates the graphic artwork file by:
randomly selecting a second stock pattern image;
randomly scaling the second stock pattern image to a size smaller than the canvas;
rotating the second stock pattern image through a randomly selected angle; and
positioning the second stock pattern image in a layer on top of the canvas.

20. The system of claim 19 wherein the media file artwork generator automatically generates the graphic artwork file by:
randomly selecting a stock top image;
randomly adjusting a opacity of the stock top image; and
positioning the stock top image in a layer on top of the canvas.

21. The system of claim 11 wherein the media file graphic artwork generator presents, via the media file selection and graphic artwork generation user interface, the graphic artwork file to the user for acceptance, and, in response to receiving the acceptance, media file graphic artwork generator stores the automatically generated graphic artwork file as an ID3 tag associated with the media file.

22. A non-transitory computer readable medium having stored thereon executable instructions that when executed by the processor of a computer control the computer to perform steps comprising:

providing, via a computer or mobile device, a media file selection and graphic artwork generation user interface through which a user can select a media file for which graphic artwork is to be generated and initiate automatic graphic artwork generation for the media file; and providing access to a media file graphic artwork generator via the computer or mobile device, where the media file graphic artwork generator, in response to user selection of the media file and the initiation of the media file graphic artwork generation, automatically selects images from at least one group of images, varies parameters of at least some of the images, and combines the images to form a graphic artwork file, wherein at least one of the image selecting, parameter varying, and image combining is performed using an algorithm structured to produce varying output in successive iterations of the algorithm invoked with the same input, and wherein the media file graphic artwork generator associates the graphic artwork file with the media file for display when the media file is browsed, displayed or played, wherein the media file comprises an audio file and wherein the media file graphic artwork generator selects image content to be included in the graphic artwork file to be displayed during playing of the audio file independently of content, genre, or metadata associated with the audio file.

\* \* \* \* \*